United States Patent
Schultheiss

Patent Number: 5,465,120
Date of Patent: Nov. 7, 1995

[54] SPIRAL BUFFER FOR NON-LINEAR EDITING

[75] Inventor: John C. Schultheiss, Grass Valley, Calif.

[73] Assignee: The Grass Valley Group, Inc., Nevada City, Calif.

[21] Appl. No.: 192,896

[22] Filed: Feb. 7, 1994

[51] Int. Cl.$^6$ ................................. H04N 5/14
[52] U.S. Cl. .................. 348/716; 348/714; 360/14.1
[58] Field of Search ........................ 348/716, 714; 360/13, 14.1; 369/14, 83; H04N 5/14

[56] References Cited

U.S. PATENT DOCUMENTS

| | | | |
|---|---|---|---|
| 4,375,083 | 2/1983 | Maxemchuk | 369/83 |
| 5,153,726 | 10/1992 | Billing | 348/716 |
| 5,267,351 | 11/1993 | Reber et al. | 369/83 |
| 5,339,393 | 8/1994 | Duffy et al. | 360/14.1 |

OTHER PUBLICATIONS

International Broadcasting Convention, Metropole Conference and Exhibition Centre, Brighton, UK, 23–27 Sep. 1988; Solid State Video Recorder, J. R. Crook and R. Billing.

Primary Examiner—James J. Groody
Assistant Examiner—Glenton B. Burgess
Attorney, Agent, or Firm—Francis I. Gray

[57] ABSTRACT

A spiral buffer for a non-linear editing system digitizes and stores an input video signal as it is simultaneously being cataloged by an operator. The digitized video signal is stored in a circular buffer of a random access non-linear storage device, such as a disk recorder, with the oldest video being overwritten by the newest video when the buffer is full so long as the oldest video has not been marked by the cataloging process to be kept. The marked video is edited, further pruning the video in the buffer. The pruning of the video in the circular buffer results in a spiral shrinking of the buffer.

2 Claims, 1 Drawing Sheet

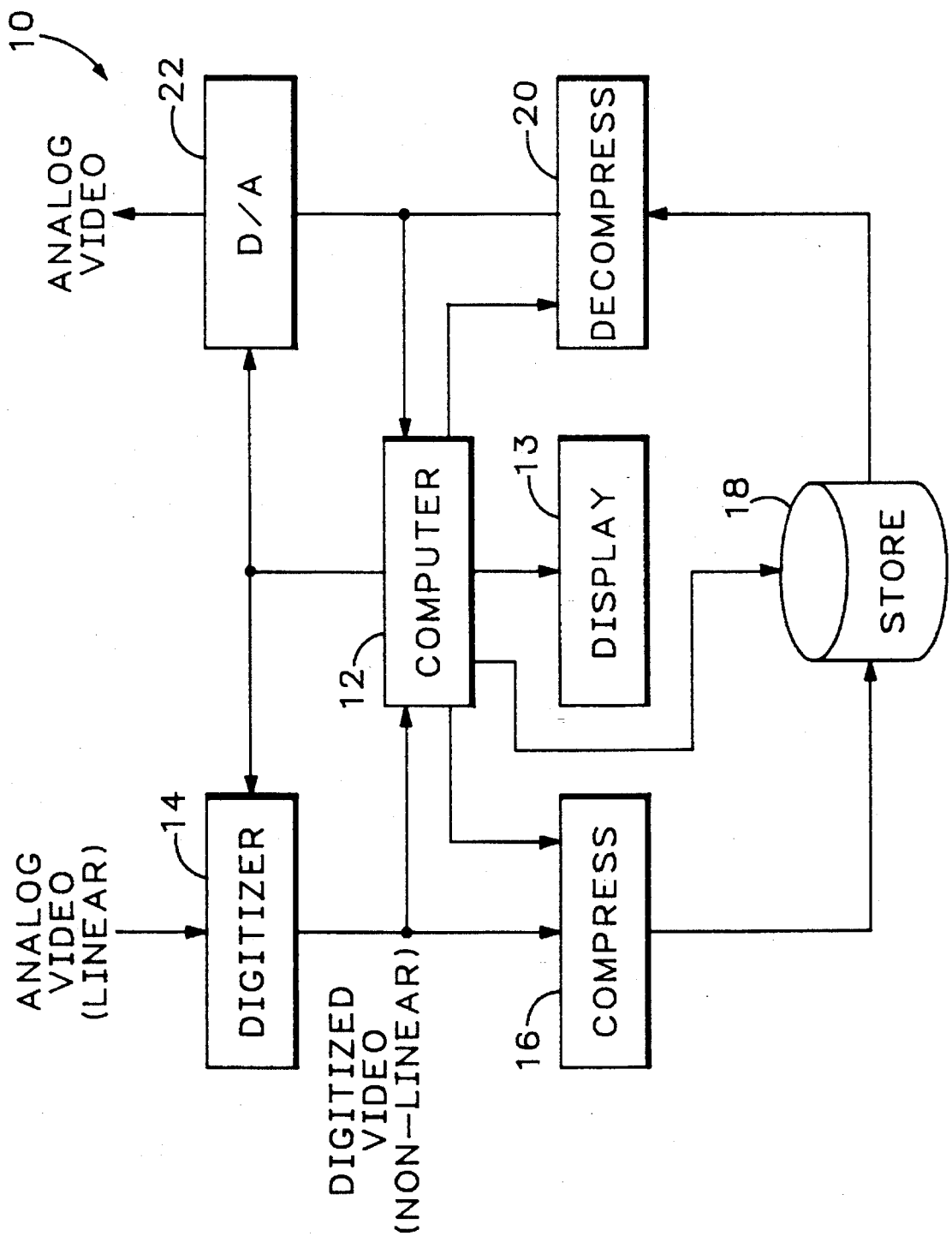

SPIRAL BUFFER FOR NON-LINEAR EDITING

BACKGROUND OF THE INVENTION

The present invention relates to video editing, and more particularly to a spiral buffer for non-linear editing where a video signal is simultaneously converted from a linear to a non-linear format while being cataloged by an operator.

A linear editing system uses a linear video source, such as a camera or video tape recorder. As the video is played from the linear video source, an operator, either with manual annotations and/or computer assisted annotations, catalogs the material presented by the video. Cataloging is a process by which the operator identifies segments of the video that are to be kept or discarded. After the video has been cataloged, then the editing process is used to sort, order, crop and otherwise alter the video that has been kept by the cataloging process. In this manner a large amount of video may be reduced to a desired time frame, for example, reducing five hours of video to a twenty-four minute situation comedy episode.

Since the video source is linear, it has to be played sequentially to arrive at a particular segment of interest. This is time consuming, as it takes time to position video tape through shuttling and jogging operations. With the advent of non-linear storage medium, such as random access video disks, the time to access any particular segment is reduced. However another step in the editing process is added, namely converting the video from a linear form to a non-linear form, also called video capture. This conversion step is added either before or after the cataloging step, which requires the video to be played twice prior to the editing step, once for cataloging and once for capturing for storage. Pictorially the conventional nonlinear editing process may be modeled as follows:

CAPTURE>>>CATALOG>>>EDIT>>>OUTPUT or

CATALOG>>>CAPTURE>>>EDIT>>>OUTPUT

The two approaches to capturing the video material involve either capturing all material prior to cataloging, which consumes large amounts of storage space, or capturing after cataloging, which consumes more of the operator's time. In the latter sequence the operator specifically must tell the system to capture the material when he finds a sequence which he may want to keep. The system must then replay the sequence to capture and save it for storage.

What is needed is a non-linear editing process that further reduces the editing time and minimizes the amount of storage space used.

SUMMARY OF THE INVENTION

Accordingly the present invention provides a spiral buffer for non-linear editing that minimizes the amount of storage space required. As an operator performs a cataloging step for an input video source, everything is converted from a linear to a non-linear form automatically, commonly called video capture. A circular buffer of user configurable size on a random access video disk storage medium is used to store this material. The space in the circular buffer occupied by the least recently used video material is reclaimed as more space is needed. Any video material that the operator marks during the cataloging step as "in" is marked as not discardable and retained. In this way the circular buffer shrinks as the editing production grows, "spiraling" into a smaller size. When the operator wants to view a part of the video that he has already seen, if it was viewed within a time frame less than the total time stored on the circular buffer, it is still available for viewing from the disk. Thus the video capture phase is folded into the cataloging phase of the editing process so that the process model becomes:

CATALOG>>>EDIT>>>OUTPUT

The objects, advantages and other novel features of the present invention are apparent from the following detailed description when read in conjunction with the appended claims and attached drawing.

BRIEF DESCRIPTION OF THE DRAWING

The FIGURE is a block diagram view of a non-linear editing system using a spiral buffer according to the present invention.

DESCRIPTION OF THE PREFERRED EMBODIMENT

Referring now to the Figure an editing system 10 includes a computer 12 that controls the editing process and with which an operator interfaces. Analog video from a linear source, such as a camera or video tape recorder, is processed by a digitizing circuit 14 to produce a digital signal while it is simultaneously viewed on a display 13 by an operator for cataloging and conversion into a non-linear form for storage, i.e., video capture. The digital signal is processed by the computer 12 for automatic annotations, such as scene changes and the like. The computer 12 also provides a mark for the digital signal in response to an operator catalog input which indicates whether the particular segment is to be kept or discarded. The digital signal may be processed by a compression algorithm 16 and then stored on a random access non-linear storage device, such as a disk recorder 18. The computer 12 maintains a list of the locations for each video segment together with the associated catalog mark, the list having a storage start address, length and catalog mark. Where the segment is broken into smaller pieces for storage, the list includes a point to the next piece of the segment.

On playback the computer 12 accesses the disk recorder 18 by directly retrieving a desired segment from the disk based upon the location(s) indicated by the list. If the video segment is compressed, then the digital signal is processed by a decompression algorithm 20, and the decompressed digital signal is input to a digital to analog converter 22. The analog video from the digital to analog converter 22 is then available for display and/or recording on a linear storage device, such as a video tape recorder. The decompressed digital signal may also be stored directly in the appropriate digital format on a digital tape recorder.

All of the incoming video material, whether analog or digital, is captured as it is being cataloged by the operator. A circular buffer, configurable in size by the operator, within the disk recorder 18 is used for storing the captured video signal as a nonlinear signal. As the circular buffer is filled up, the oldest video segments are subject to being overwritten by the newest video segments. However the computer 12 only overwrites the oldest video segments which are not marked during the cataloging process by a "save" indication. In this manner the circular buffer need not be so large as to store the entire video signal to be edited, but only the marked video segments. The operator may recall any segment from the disk recorder 18 and further edit it by pruning it, breaking it up into lesser segments, some of which are kept, and the like. As the "weeding" continues the circular buffer shrinks in size to hold only those segments that are retained. At the conclusion of the editing process the segments are read from the disk recorder 18 in a sequence that produces a final linear video product that may be stored on a linear storage device.

Thus the present invention provides a spiral buffer for a non-linear editing system that is configurable in size, which size is less than the total amount of video to be processed, and while the video is simultaneously cataloged and captured for storage on a random access non-linear storage device, new video material overwrites the oldest video material in the spiral buffer so long as the video material has not been marked as being kept.

What is claimed is:

1. A method of processing a video signal in a non-linear editing system comprising the steps of:

simultaneously cataloging and capturing for storage the video signal as it is received, the cataloging indicating which segments of the video signal are to be kept;

storing the video signal from the cataloging and capturing step in a circular buffer of a random access non-linear storage device as it is received; and overwriting old segments of the video signal in the circular buffer with new segments of the video signal during the storing step when the circular buffer is full and the old segments have not been indicated by the cataloging and capturing step to be kept.

2. The method as recited in claim 1 wherein the cataloging and capturing step comprises the steps of:

marking the segments of the video segment to be kept with a catalog mark; and automatically listing a start location, a length and the catalog mark for each segment in the random access non-linear storage device as it is received.

* * * * *